US008666341B2

(12) United States Patent
Marsolais et al.

(10) Patent No.: US 8,666,341 B2
(45) Date of Patent: Mar. 4, 2014

(54) MULTI-MODE COMMUNICATION UNIT

(75) Inventors: Alexandre Marsolais, Blainville (CA); Michel Forte, Montreal (CA); Denis Couillard, Montreal (CA)

(73) Assignee: Ultra Electronics TCS Inc., Montreal, Quebec (CA)

( * ) Notice: Subject to any disclaimer, the term of this patent is extended or adjusted under 35 U.S.C. 154(b) by 227 days.

(21) Appl. No.: 13/195,305

(22) Filed: Aug. 1, 2011

(65) Prior Publication Data

US 2012/0302155 A1 Nov. 29, 2012

Related U.S. Application Data

(60) Provisional application No. 61/405,708, filed on Oct. 22, 2010.

(51) Int. Cl.
*H04B 1/04* (2006.01)

(52) U.S. Cl.
USPC .................. 455/127.4; 455/435.2; 455/552.1

(58) Field of Classification Search
USPC ............ 455/127.4, 426.1, 432.1, 434, 435.1, 455/435.2, 436, 552.1, 553.1, 160.1; 370/331–334
See application file for complete search history.

(56) References Cited

U.S. PATENT DOCUMENTS

| | | | | |
|---|---|---|---|---|
| 6,252,559 | B1 * | 6/2001 | Donn | 343/781 CA |
| 6,914,913 | B2 * | 7/2005 | Sheynman et al. | 370/469 |
| 7,657,282 | B2 * | 2/2010 | Suzuki et al. | 455/552.1 |
| 8,031,618 | B2 * | 10/2011 | Hu | 370/241 |
| 8,326,309 | B2 * | 12/2012 | Mody et al. | 455/452.1 |
| 2002/0160775 | A1 * | 10/2002 | Pecen et al. | 455/434 |
| 2002/0198020 | A1 * | 12/2002 | Mooney | 455/553 |
| 2003/0003951 | A1 * | 1/2003 | Leprieur et al. | 455/552 |
| 2003/0119547 | A1 * | 6/2003 | Leyh et al. | 455/552 |
| 2004/0204035 | A1 * | 10/2004 | Raghuram et al. | 455/553.1 |
| 2005/0047398 | A1 * | 3/2005 | Yeom | 370/352 |
| 2005/0136978 | A1 * | 6/2005 | Kamdar et al. | 455/558 |
| 2006/0002683 | A1 * | 1/2006 | Onomatsu | 386/68 |
| 2007/0058595 | A1 * | 3/2007 | Classon et al. | 370/337 |
| 2007/0183461 | A1 * | 8/2007 | Eyal et al. | 370/503 |
| 2007/0232349 | A1 * | 10/2007 | Jones et al. | 455/552.1 |
| 2007/0232350 | A1 * | 10/2007 | Dunn et al. | 455/552.1 |
| 2008/0037504 | A1 * | 2/2008 | Jeon et al. | 370/342 |
| 2008/0090605 | A1 * | 4/2008 | Park et al. | 455/552.1 |
| 2008/0102886 | A1 * | 5/2008 | Sakurada | 455/553.1 |
| 2008/0161042 | A1 * | 7/2008 | Lee et al. | 455/553.1 |
| 2010/0142487 | A1 * | 6/2010 | Kim | 370/332 |
| 2010/0309847 | A1 * | 12/2010 | Bharadwaj | 370/328 |
| 2011/0007849 | A1 * | 1/2011 | Jones | 375/340 |

(Continued)

FOREIGN PATENT DOCUMENTS

KR 20040023439 3/2004

*Primary Examiner* — Dominic E Rego
(74) *Attorney, Agent, or Firm* — Norton Rose Fulbright Canada LLP

(57) ABSTRACT

There is described a method of operating a multi-mode communication unit. For each radio frame of a radio communication frame structure, the unit selectively sets a mode of radio frequency operation for one of transmission and reception for a selected radio frame duration, for operation in a radio communication mode of operation or in a sensing mode of operation. The unit may also interrupt a transmission task within a given radio frame at a time selected in accordance with a sensing instant of a second communication unit to which the data being transmitted and perform a different task for a duration of the sensing instant of the second communication unit.

15 Claims, 11 Drawing Sheets

(56) References Cited

U.S. PATENT DOCUMENTS

| | | | | |
|---|---|---|---|---|
| 2011/0199963 | A1* | 8/2011 | Shaw | 370/328 |
| 2011/0261687 | A1* | 10/2011 | Armstrong et al. | 370/230 |
| 2012/0058794 | A1* | 3/2012 | Valentine | 455/513 |
| 2012/0093031 | A1* | 4/2012 | Wang et al. | 370/254 |
| 2012/0214460 | A1* | 8/2012 | Russell | 455/418 |

* cited by examiner

| Label | Mode |
|---|---|
| **T** | Transmitting |
| **J** | High Power Jamming Hop |
| **j** | Low Power Jamming Hop |
| **S** | Sensing |
| R | Receiving |
| O | Other mode |

| | TN | | TN+1 | | TN+2 | | TN+3 | | TN+4 |
|---|---|---|---|---|---|---|---|---|---|
| FN | | | | | | | | | R |
| FN+1 | | | R | | | | | | |
| FN+2 | | | | | | | | | |
| FN+3 | R | | | | | | R | | |
| FN+4 | | | | | R | | | | |

MULTI-MODE COMMUNICATION UNIT

CROSS-REFERENCE TO RELATED APPLICATIONS

This application claims priority under 35 U.S.C. §119(e) from U.S. Provisional Patent Application No. 61/405,708, filed on Oct. 22, 2010, the contents of which are hereby incorporated by reference.

TECHNICAL FIELD

The present invention relates to the field of data transmission between communication units. In particular, the invention relates to communication units sending data back and forth in friendly and/or hostile environments.

BACKGROUND OF THE ART

The field of Electronic Warfare (EW) is split into two categories: Electronic Counter Measures (ECM) and Electronic Counter Counter-Measures (ECCM). Employing ECM jamming tactics means using a system which can degrade the operation of enemy electronic systems while negligibly affecting the operation of friendly electronic systems. More specifically, this consists in generating or transmitting a secondary radio signal which has the sole purpose of interfering or degrading the reception of a primary enemy radio signal so that it prevents distant enemy receiver(s) from correctly recovering the primary signal. The primary radio signal is usually considered a threat or an enemy signal intended for use by a distant enemy receiver(s), whereas the secondary radio signal is considered as the counter-measures or jamming signal which attempts to prevent any useful utilization of the primary signal by the distant enemy receiver.

ECCM is a group of practices or techniques that reduce the probability of a jammer impeding a communication link. This is done by reducing the probability of detection and interception, thereby causing link degradation or loss of link. The ECCM communication mode may involve having a primary signal adequately encoded and/or distributed in frequency so that the receiving electronics of the receiver(s) can easily suppress or avoid a secondary jamming signal or uncorrelated interference energy while at the same time enhancing the intended primary signal energy so as to be more clearly demodulated for intelligence by the receiver(s).

Other techniques in this field include sensing (SIGINT) for RF sensing, and radio communication of data. Typically, ECM equipment and sensing equipment are made of individual units, i.e. one functionality per unit. Similarly, radio communication units are conceived to only communicate data, with limited abilities to sample the current channel of operation to assess its quality. Sensing techniques may also be used to enhance primary radio communications and therefore may not always be EW related.

Each mode of operation has its own purpose and therefore, a unit designed to operate in a given mode is provided with a particular set of features and the hardware/software combination that will result in these features. Hence, exploiting all of the various possible techniques in the field of EW and radio communication can get expensive and complex.

SUMMARY

There is described herein a method to provide radio communication and sensing in a single unit. Other modes of operation, such as ECM, ECCM may also be provided in the same unit. In addition, this method allows the unit to be pre-configured or configurable on the fly for different functionalities simultaneously. For on the fly configuration, a decision engine is used to make and implement decisions in real-time.

In accordance with a first broad aspect, there is provided a method of operating a multi-mode communication unit, the method comprising: for each frame of a data structure, selectively setting a mode of operation for one of transmission and reception for a given duration, for operation of the first unit in a radio communication mode of operation or in a sensing mode of operation; and interrupting a task within a given frame at a time selected in accordance with a set of priorities determined by the unit, and performing a different task for a given duration, the different task and the given duration being selected by the unit.

In accordance with a second broad aspect, there is provided a multi-mode communication unit comprising: at least one transmitter for transmitting outgoing signals; at least one receiver for receiving incoming signals; a sensing module for channel evaluation, sampling and signal post-processing; a waveform processor for modulating outgoing signals in a radio communication mode and for demodulating incoming signals in the radio communication mode and in a sensing mode; a central module connected to the at least one receiver, the at least one transmitter, and the waveform processor and adapted for selectively setting a mode of operation for each frame of a data structure for one of transmission and reception for a given duration, for operation of the unit in a radio communication mode of operation or in a sensing mode of operation; and a task module adapted for interrupting a task within a given frame at a time selected in accordance with a set of priorities, and performing a different task for a given duration.

In some embodiments, the unit comprises a decision engine to make at least some of the decisions regarding tasks and priorities on the fly, in near real-time. This configuration may be combined with some pre-configured priorities applied by the task module. Alternatively, all of the priorities may be pre-configured and applied by the task module.

In some embodiments of the method and the unit, the set of priorities comprises optimizing frame use of the data structure, and interrupting a task comprises interrupting a transmission of data within a given frame at a time selected in accordance with a sensing instant of a second communication unit to which the data is being transmitted and performing the different task for a duration of the sensing instant of the second communication unit.

In this specification, the term pseudo-random is meant to be interpreted in its most theoretical form. The implementation of such is only limited to the ability of both units in the link to have synchronized sequences, such that the implementation can be, but is not limited to, the use of an encryption unit, LFSR, linear and non-linear methods, and chaotic sequence generators. The term "synthetic" is intended to mean the randomness of the structure that is generated in such a way that the receiver can synchronize to the structure. Typically this technique involves chaotic, pseudo-random, and/or encryption engines.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

A multi-mode communication unit having multiple modes of operation is described herein. The modes of operation are provided concurrently within a single unit by using a flexible transmission/reception structure that plans in time, frequency and space.

Figure 1A:
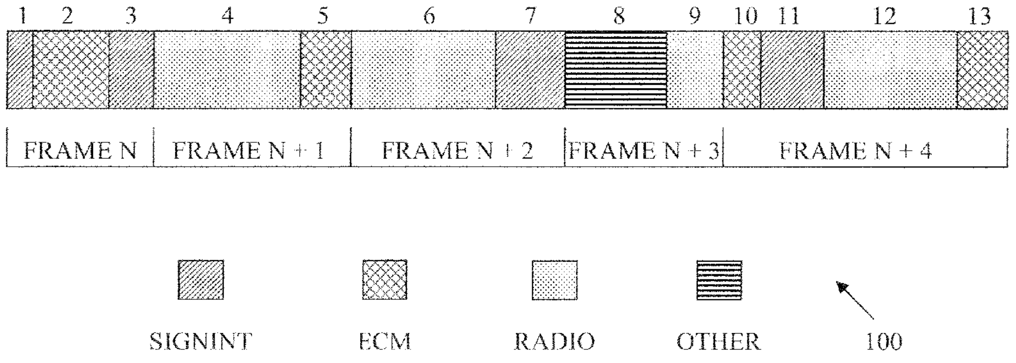
FIGS. 1A and 1B are exemplary data structures having frames to be used for transmission and reception in a multi-mode environment.

FIG. 1*a* is an exemplary structure used by the multi-mode unit for transmission and/or reception. The structure is composed of a plurality of frames. Each frame has one or more slots allotted thereto. The slots may correspond to time slots for time division multiplexing, frequency slots for frequency division multiplexing, or any other form of successive intervals for interleaving bits or symbols to transmit two or more signals over a common path.

Each slot may be used for a given purpose. For example, in the illustrated structure, slots 1, 3, 7, and 11 are reserved for sensing (including more sophisticated signal intelligence gathering (SIGINT)). Sensing may be used for interference detection, by allowing channel sampling combined with signal post processing to determine what type of impairment, interference and/or threat is present. Such knowledge can be used to generate and update frequency plans. Some examples of post processing of a sampled signal are FFT, power detection, and signal characteristics detection via cumulant and moment statistical analysis. Other possible post processing tasks are noise temperature measurement, continuous channel awareness, jamming detection, detection of signal signatures in transmitting neighbors, detection of presence of co-site or interference, and spectrum availability.

Slots 2, 5, 10 and 13 are used for Electronic Counter Measures (ECM). A possible ECM application is to determine the most effective jamming or deception waveform to use as a counter measure in accordance with the sensed information and depending on the mission requirements. For example, in ECM mode, the response of a victim radio to a simple set of jamming approaches can be studied to determine the ECCM capabilities of the victim and choose the best one to use thereafter.

Slots 4, 6, 9, and 12 are used for radio communications, i.e. sending and/or receiving data in standard or ECCM mode. Electronic Counter Counter Measures (ECCM) may use sensed information to determine the next hopping frequency having the highest probability of being interference/jamming free at the next hop, such that at the end of the transmission the next hop frequency is sent to a remote unit (as per FIG. 11). In case of complete transmission loss during a hop, the next frequency of the pseudo random sequence may be used instead. This mode may also be used to exchange information on sense frequency quality in order to determine what is the next frequency. Note that the pseudo-random sequence may be known and synchronized by both radio units. Slot 8 is tagged as "other" and may be used for any other purpose, such as spoofing and luring a threat.

Each mode may be of variable duration and may be placed anywhere in the frames (or sub-frames). The repetition rate does not need to be periodic (or may not be desired), but may be if desired. Frame structure may be made of any combination of the different modes of operation and (sub)frame durations are variable in time either pseudo randomly or not. The duration of each mode, i.e. sub-frame, is variable either pseudo randomly or not. The start of a frame may be variable or pseudo random with respect to its next occurrence in time, ensuring that any mode or any sequence of mode combination has a low probability of intercept (LPI) and a low probability of detection (LPD). The modes, with the exception of radio and ECCM, are independent of traffic rate, modulation, etc.

Figure 1B:
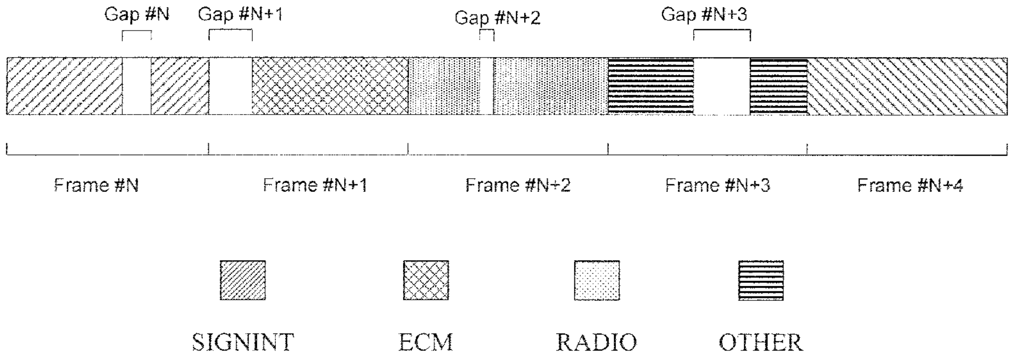

Similarly, FIG. 1*b* illustrates a series of frames, whereby a gap of varying size is selectively present in any given frame. The location and size of the gap is determined using a decision engine inside the unit. A typical objective would be to optimize the use of a frame in accordance with information obtained from one or more neighboring nodes with which communication is established, and with information obtained by the communicating node itself with regards to its surroundings and its goals.

When the hardware for sensing and receiving is shared within a unit, it may not be possible to perform these two functions at the same time. Therefore, the sensing process is synchronized between two units, such that during a sensing (or SIGINT) event at a second unit the transmitter at a first unit does not transmit or does not transmit information that should be recovered by the first unit. During remote unit sensing, the local transmitter can take advantage of the required pause in transmission, such that the local decision engine can select to spoof, sense, jam or communicate with other nodes during the remote sensing event at a frequency different from the remote sensing frequency and/or towards another direction as required so as to not interfere with the remote node sensing process. Note that another implementation could permit more than one of these processes simultaneously, where no hardware would be shared and/or when RF isolation is sufficient.

Figure 1C:
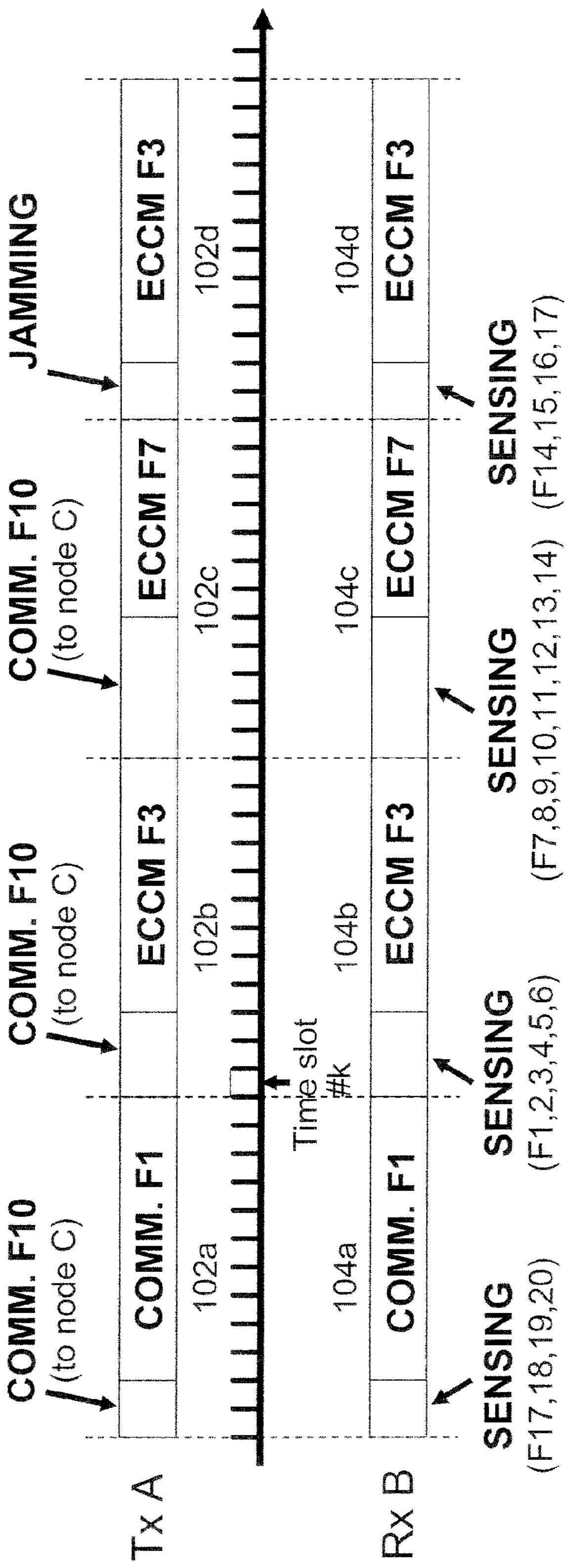
FIG. 1C is an exemplary pair of data structures for communication between two nodes.

An example of optimizing the use of a frame is illustrated in FIG. 1C using Node A and Node B as two nodes between which communication has been established. Frames 102 are for Node A transmitter (Tax A) while frames 104 are for Node B receiver (Rx B). Node A uses a first frame 102*a* to transmit a communication waveform to Node B on Frequency 1 (F1).

However, Node B has a sensing instant during frame 104*a* and therefore, will not be listening to the transmission from Node A for the first 2 time slots of that frame. Node A coordinates a communication instant of the same duration with Node C and simultaneously with the sensing instant at Node B in order to optimize the use of the frame 102*a*. Based on various information, including sensing, and in coordination with Node B, Node A Decision Engine uses the next frame 102*b* to switch to an ECCM communication mode where both the transmit frequency and the start of its communication instance with Node B within the frame changes, possibly in a pseudo-random way. Node B again has a sensing instance planned in frame 104*b*, and its duration is now coordinated with the adjusted duration of an expected transmission from Node A in frame 102*b*. In frame 102*c*, both the transmit frequency and the start of its communication instance with Node B change, with Node B coordinating accordingly its sensing activities in frame 104*c*. In frame 102*d*, the Node A Decision Engine uses the early part of the frame to transmit a jamming signal away from Node B and at a different frequency before resuming coordinated communications with Node B on Frequency 3.

The process of sensing at Node A may be independent of the transmission at Node A. In order for simultaneous sensing and transmitting to take place, the hardware used for sensing and transmission must be independent, such as that found in a Frequency Division Duplexing (FDD) Full Duplex architecture. Other possible architectures for providing separate hardware for sensing and transmitting will be readily understood by those skilled in the art.

Figure 2A:
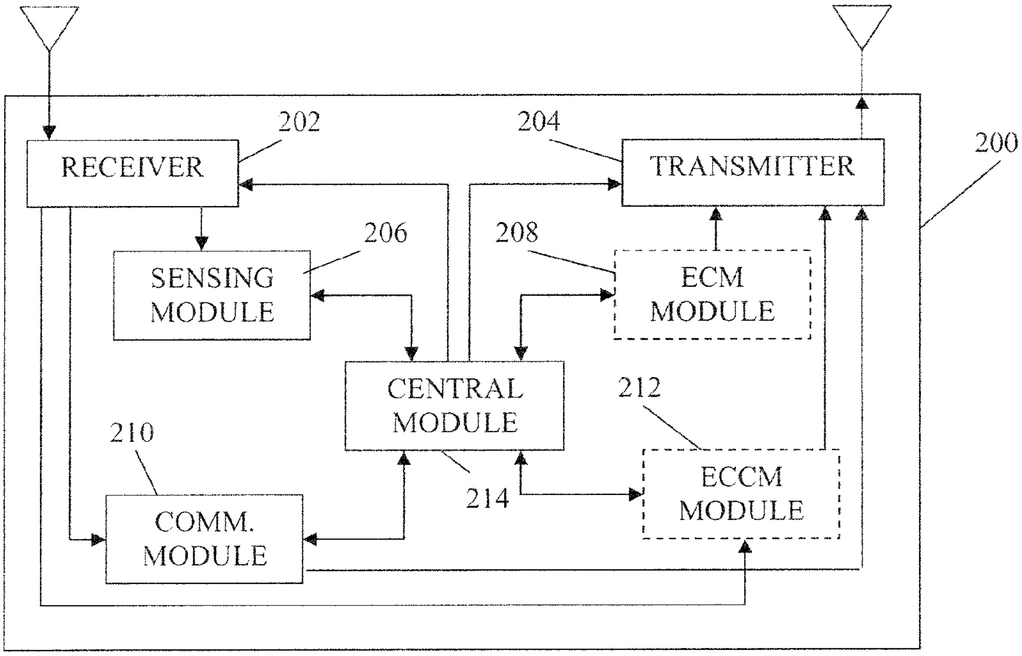
FIG. 2A is an exemplary block diagram of a multi-mode unit to operate with the synthetic flexible data structure of FIG. 1.

FIG. 2*a* illustrates a very high level block diagram of a multi-mode unit 200. Separate modules are illustrated to show the features of sensing 206, ECM 208, ECCM 212, and radio communication (communication module 210). A receiver 202 and a transmitter 204 are connected to an antenna for sending and receiving signals. The receiver 202 provides received signals to the sensing module 206 for sensing, and to the communication module 210 and/or the ECCM module 212 for data reception. The transmitter 204 receives signals for transmission from the ECM module 208, the ECCM module 212, and/or the communication module 210.

In a different embodiment of multi-mode unit 200, ECM module 208 and/or ECCM module 212 may not be present.

Figure 2B:
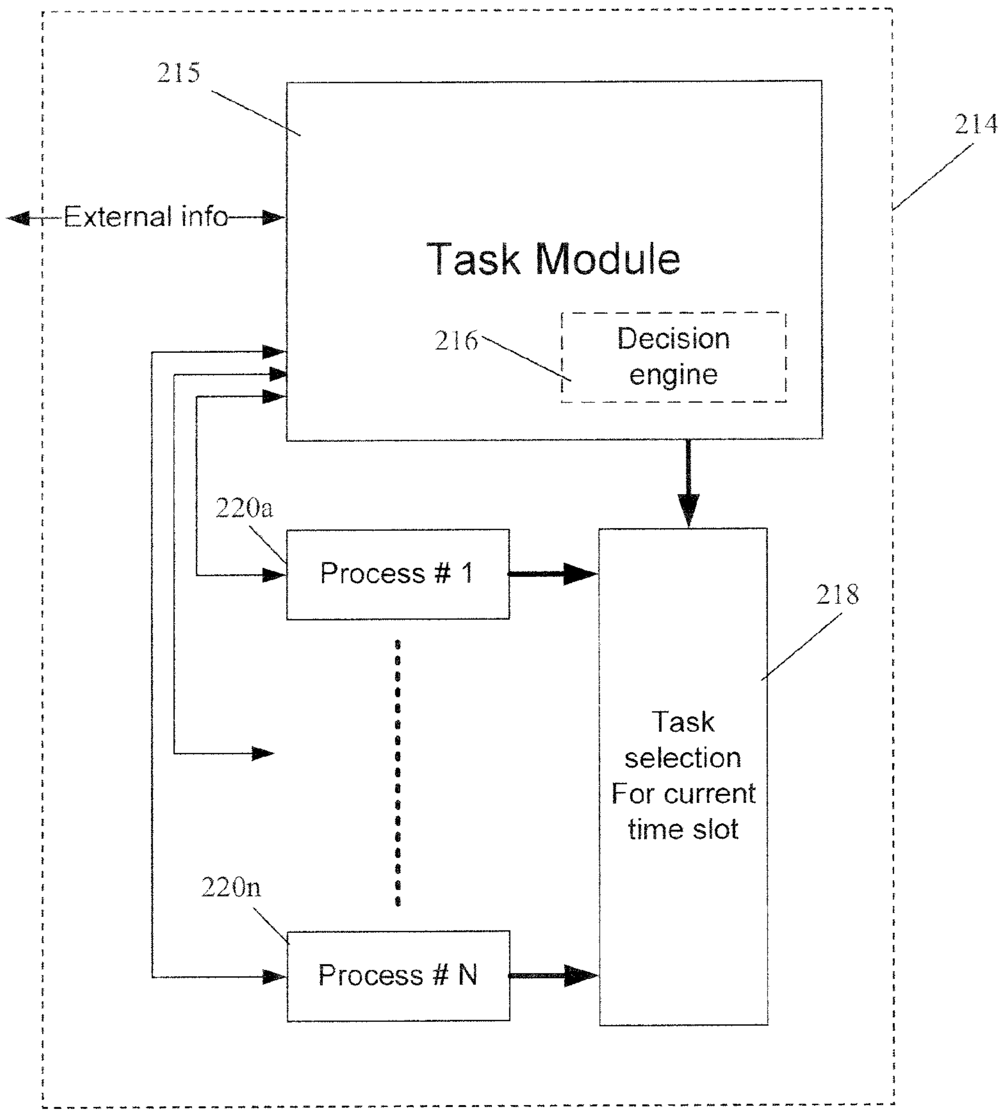
FIG. 2B is an exemplary block diagram of the central module of FIG. 2A.

A central module 214 is connected to all other modules in order to coordinate transmission and reception, and, for on the fly configuration and adaptation, to use information obtained from all modules in the decision making process of the unit. The various modes of operation may be used to generate threat and interference behavior information. Knowledge of space, time and frequency data can be stored and exchanged between nodes and higher echelon resources. FIG. 2*b* illustrates the central module 214 in more detail, in accordance with one embodiment.

The task module 215 controls which process 220*a*-220*n* gets access to the medium, when, and for how long. A process may be equivalent to a mode of operation or one of the modules 206, 208, 210, 212 illustrated in FIG. 2*a*. The medium here is defined as the spectral environment of the multi-mode unit 200. Also, the task module 216 tracks the requirements of each process 220*a*-220*n* and prioritizes the task to be performed based on the information received from each process 220*a*-220*n* and possible external requests from the network or a user.

In one embodiment, the task module 215 is pre-configured with priorities and applies these priorities as they were set. In an alternative embodiment, a decision engine 216 is provided in the task module 215. The decision engine 216 allows the unit 200 to make decisions on the fly and in near real-time, as a function of information received. A task selection module 218 will then implement the decisions made by the decision engine 216 for.

In one embodiment, the decision engine 216 uses game theory in its decision making to maintain an optimum point of operation for the different processes 220*a*-220*n* based on a set of specific goals to be achieved and maintained. Such an engine may make use of the hidden Markov model and/or one of the Lyapunov methods. For example the decision engine 216 may track the communication traffic flow and based on the requirement of quality of service or required availability, it will buffer or not the traffic of information and select the appropriate waveform or modulation to meet the goal of the communication process, while at the same time meeting the goal of the sensing and jamming processes, if only those are involved. If margin is available and spoofing is on a best effort basis, the decision engine 216 may decide to allocate time slots to the spoofing process to better its system level goal achievement metrics.

The goal of the decision engine 216 may be set to ensure that specific process requirements (or goals) are met and to maximize goals whenever possible. The decision engine 216 may decide how each process is controlled and may determine the best course of operation, such as selecting the minimum time slot duration and allocating each process a number of time slots. Note that in order to optimize its goal function, the decision engine 216 may decide to change the time slot duration in real time, or to do it in a randomized or pseudo-randomized fashion.

Figure 2C:
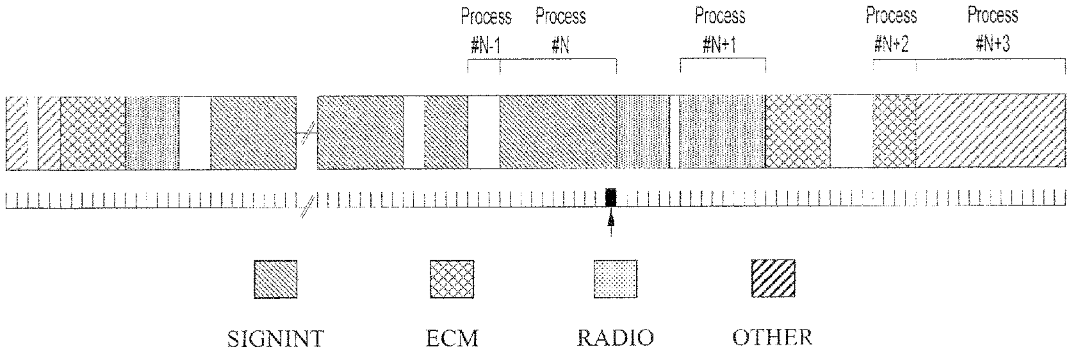
FIG. 2C is an exemplary illustration of frame use per process, as controlled by the central module of FIG. 2A.

In FIG. 2*c*, the different processes are identified. The number of process will only be limited by the amount of resources and processing performance of the implementation. The decision engine 216 will have the possibility of distributing the processes and processing effort to general purpose processors, digital processing engine or ASIC processors depending on the resources available. Note that the decision engine 216 may decide to terminate a non-essential process if its impact on the overall goal of the unit 200 is detrimental to the overall maximization of the goals of all existing processes.

Note that sensing events can be made random, pseudo-random, pre-configured, or can also be sporadically requested by other external processes to the unit 200, which the decision engine 216 adds to its goals and list of required tasks or processes. Scheduling is done by the decision engine 216 according to the optimum performance of the multi mode unit 200 operation.

The decision engine 216 will ensure that frequency coordination between nodes in a same environment will be optimal within the boundaries of its own solution space and sets of goals. Note that it is possible that a decision engine 216 may decide to use a frequency used by one of his neighbors but in a way that the generated interference has limited impact on his neighbor performance if it deems both an acceptable solution within its set of policies and the best approach to optimizing its goals.

Figure 3:
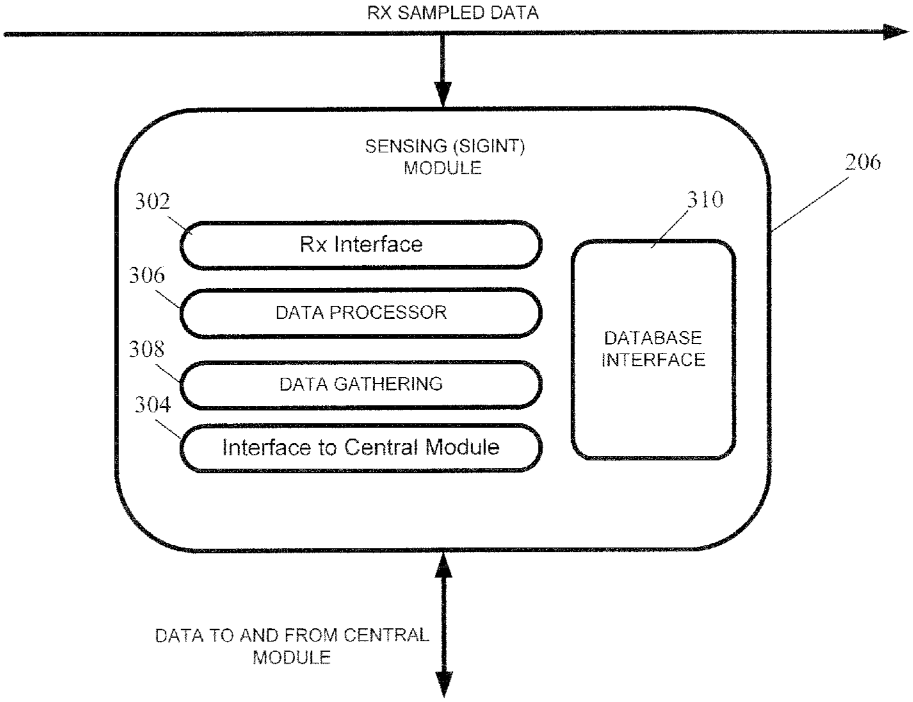
FIG. 3 is an exemplary block diagram of a sensing module.

FIG. 3 is an exemplary block diagram for the sensing module 206. A receiver interface 302 is present for connection and interaction with the receiver 202. An interface to the central module 304 is also present. A data processor 306 transforms received data into useful information through analyzing, sorting, summarizing, calculating, disseminating and storing data. Data gathering 308 takes the useful information, i.e. the sensing data, from the data processor 306 and distributes it accordingly, either to the central module 214 or to an internal or external storage medium. A database interface 310 may be used to interact with a storage medium. A request from the central module 214 to the storage medium can be made via the sensing module 206.

Figure 4:
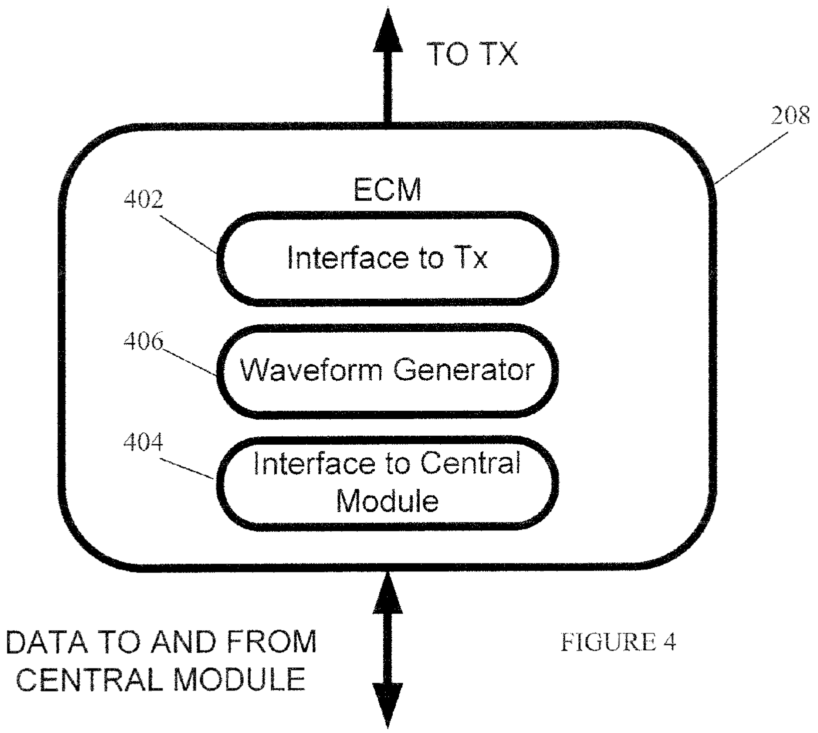
FIG. 4 is an exemplary block diagram of an ECM module.

FIG. 4 is an exemplary block diagram for the ECM module 208. A waveform generator 406 generates an ECM waveform and sends it to the transmitter 204 via a Tax interface 402, which may be simply a digital to analog converter. Data may be exchanged between the ECM module 208 and the central module 214 via an interface 404. Data exchanged this way is used for synchronization purposes and ECM mode control. This module may be implemented using a general purpose processor, a field programmable gate array, an ASIC or any combination of these three devices.

Figure 5:
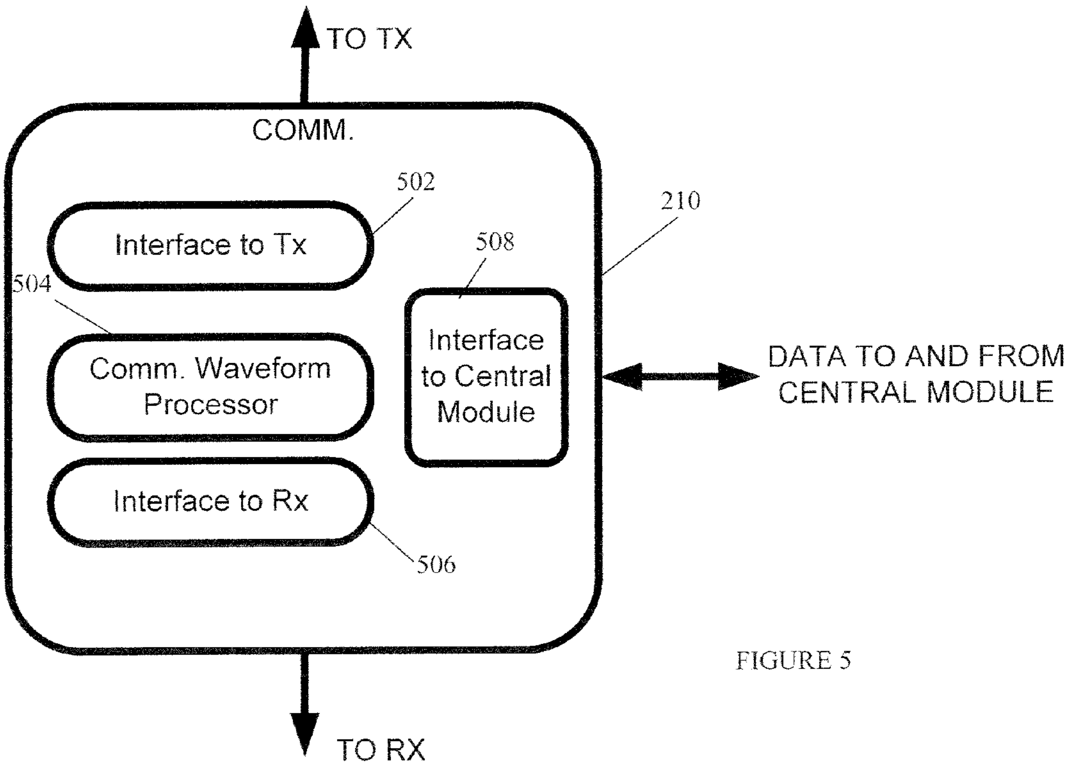
FIG. 5 is an exemplary block diagram of a radio communication module.

FIG. 5 is an exemplary block diagram for the communication module 210. A waveform processor 504, such as a modem, modulates data into a signal (RF or other type) to send it and demodulates the signal into data to receive it. Data is exchanged with the transmitter 204 via a Tax interface 502 and with the receiver 202 via an Rx interface 506. Possible implementations for the interfaces include but are not limited to ADC/DAC, digital baseband, analog baseband, analog IF, and RF. Control and data signals are exchanged with the central module 214 via an interface 508. Data exchanged this way is used for synchronization purposes and communication mode control. This module may be implemented using a general purpose processor, a field programmable gate array, an ASIC or any combination of these three devices.

Figure 6:
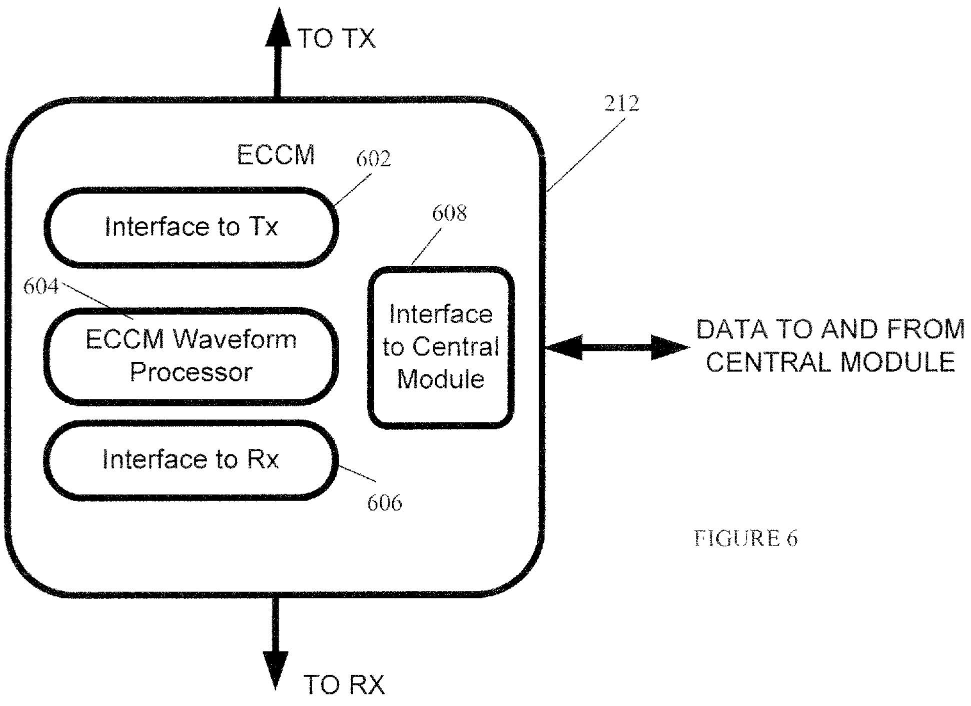
FIG. 6 is an exemplary block diagram of an ECCM module.

FIG. 6 is an exemplary block diagram for the ECCM module 212. An ECCM waveform processor 604, such as a modem, modulates the data and sends it and demodulates the received signal into data. The waveforms generated by the ECCM waveform processor 604 are slightly different than those generated by the communication waveform processor 504 in that they are modulated using particular characteristics that make them harder to intercept and detect. Data is exchanged with the transmitter 204 via a Tax interface 602 and with the receiver 202 via an Rx interface 606. Control and data signals are exchanged with the central module 214 via an interface 608. Data exchanged this way is used for synchronization purposes and communication mode control. This module may be implemented using a general purpose processor, a field programmable gate array, an ASIC, digital signal processing processors or any combination of these devices.

Figure 7:
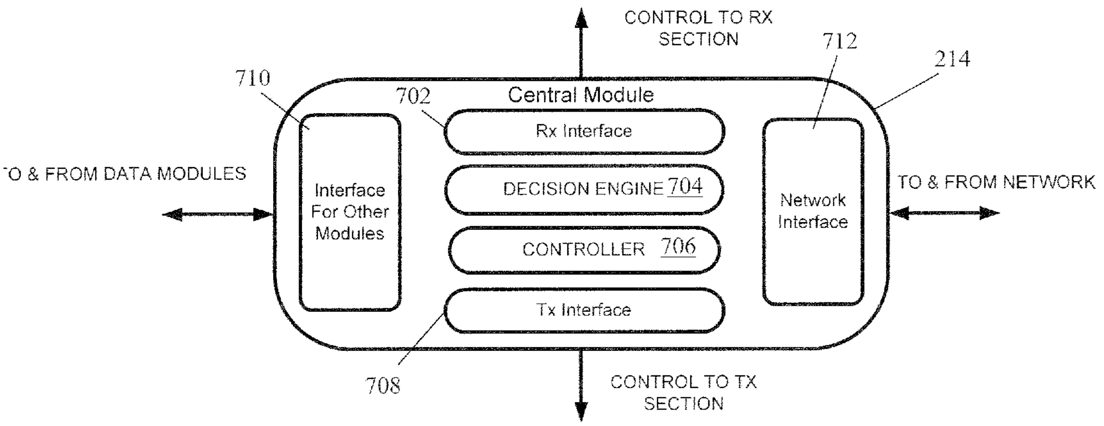
FIG. 7 is an exemplary block diagram of a central module to coordinate the sensing, ECM, radio communication, and ECCM modules.

FIG. 7 is an exemplary block diagram for the central module 214. When multi-mode unit 200 is implemented to support on the fly configuration and adaptation of the system, a decision engine 704 takes in the data gathered via the respective modules 206, 208, 210, 212 and makes decisions regarding modes of operations, waveform modulation, frequency selection, and various operation strategies. A controller 706 sends control instructions for operation of the unit 200 to the respective modules 206, 208, 210, 212 via interface 710. The central module 214 can also interface with the transmitter 204 via a Tax interface 708 and with the receiver 202 via an Rx interface 702. A network interface 712 allows the central module 214 to send and receive data to a network. This module may be implemented using a general purpose processor, a field programmable gate array, an ASIC or any combination of these three devices.

The decision engine 704 in the central module 214 configures the set of frames illustrated in FIG. 1 in accordance with the data received from the various modules 206, 208, 210, 212 (or a subset of these modules) and the particular objectives or policies of the unit 200. Duration, position, and attribution of each slot is set by the decision engine 704 and implemented in the respective modules 206, 208, 210, 212 via the controller 706, which sends the appropriate control signals to each module 206, 208, 210, 212 in order to have the module use the slot that has been attributed for its given mode of operation.

Figure 8:
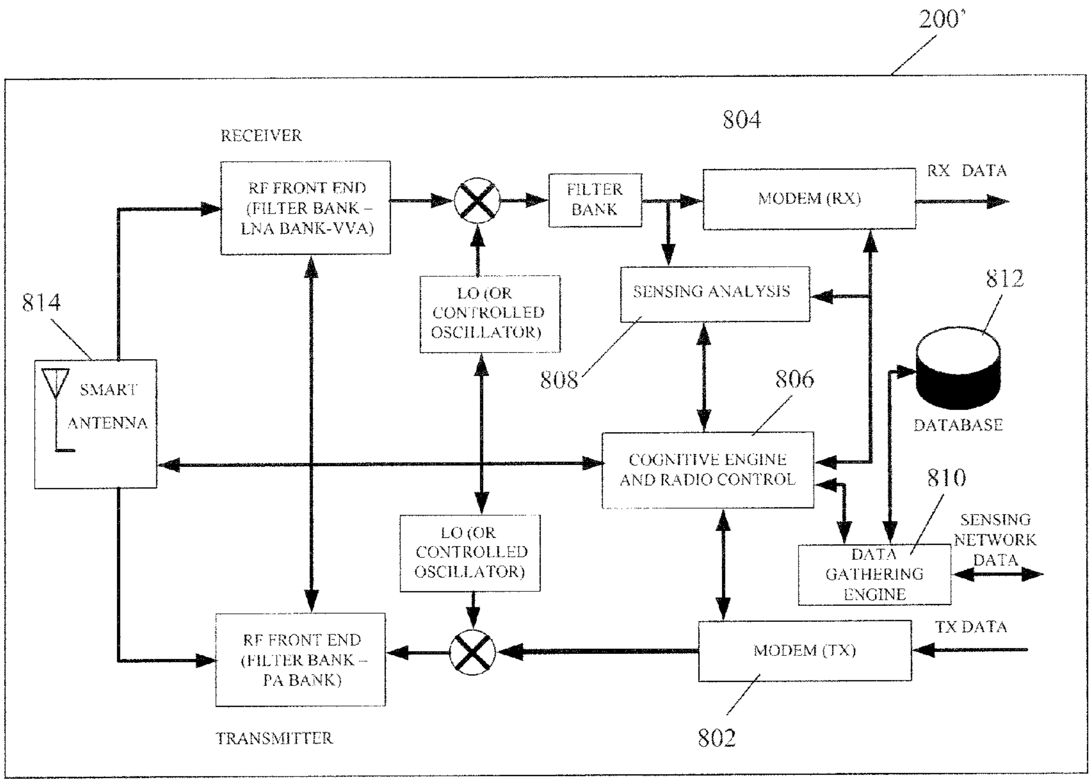
FIG. 8 is an exemplary implementation of the multi-mode unit illustrated in FIG. 2A.

FIG. 8 illustrates an exemplary implementation of the multi-mode unit of FIG. 2*a*. In this case, the various components of the unit 200' share some resources and therefore are not separated as clearly and distinctly as illustrated in FIG. 2*a*. In particular, Tax modem 802 generates waveforms for transmission. These waveforms can be of a format for standard radio communication or they can be of a format for ECM or ECCM. This exemplary implementation makes use of a smart antenna which may have beam-switching, beam-forming, null-steering, and/or multi-band capabilities. Other embodiments may use more conventional, non-adaptive antennas. Smart antennas may be used to enhance Radio communication, ECM, ECCM and/or sensing abilities.

Modem 804 can serve to demodulate waveforms for radio communication or ECCM. A sensing analysis module 808 has part of the functions of the sensing module 206 as it is used to receive data and perform the sensing analysis.

A cognitive engine and/or radio control module 806 has part of the functions of the communication module 210, the ECCM module 212, the ECM module 208 and the central module 214 as it is used to trigger the ECM and ECCM modes or change parameters within the communication mode and to control data reception and transmission. The cognitive engine and/or radio control module 806 acts on the RF front end, the LO, and the antenna to have the unit 200' operate in the desired mode.

A data gathering engine 810 collects data and stores it in a database 812 for future use, and exchanges the data with the network. In one embodiment, a smart antenna 814 (also known as an adaptive array antenna) may be used. Alternative embodiments include an electro-mechanical tuning element or another type of antenna. The smart antenna module 814 may use smart signal processing algorithms to identify a spatial signal signature such as the direction of arrival (DOA) of the signal, and calculates beam-forming vectors to track and locate the antenna beam on a target. Such processing may occur in the antenna assembly or it can be done in the multi-mode unit 200. Selecting an optimal antenna beam configuration offers additional protection against jamming and improves the spatial environment awareness capability via sensing of the spectrum for each available antenna beam configuration in order to obtain a 360 degree spatial awareness, in the radio frequency domain. Also, as per FIG. 9, the smart antenna module can be used to detect an optimal phase for the desired signal to be received and optimal nulling of the undesired interferer.

One way to allow the unit to transmit, either in ECM, ECCM, or radio mode while simultaneously allowing the sensing mode of operation, is to have supporting hardware with transmission and reception chains that are independent, as illustrated in FIG. 8. In addition, mode control ensures no mode interference will occur. The unit hardware can support both time division duplex (TDD) and frequency division duplex (FDD) simultaneously, or Hybrid Fractional Frequency Division Duplex (HFFDD). In hybrid mode, the transmitting time is independent of the receiving time, i.e. X % of Tax and Y % of Rx and possibly Z % of other modes of operation at different or equal center frequency.

Figure 9:
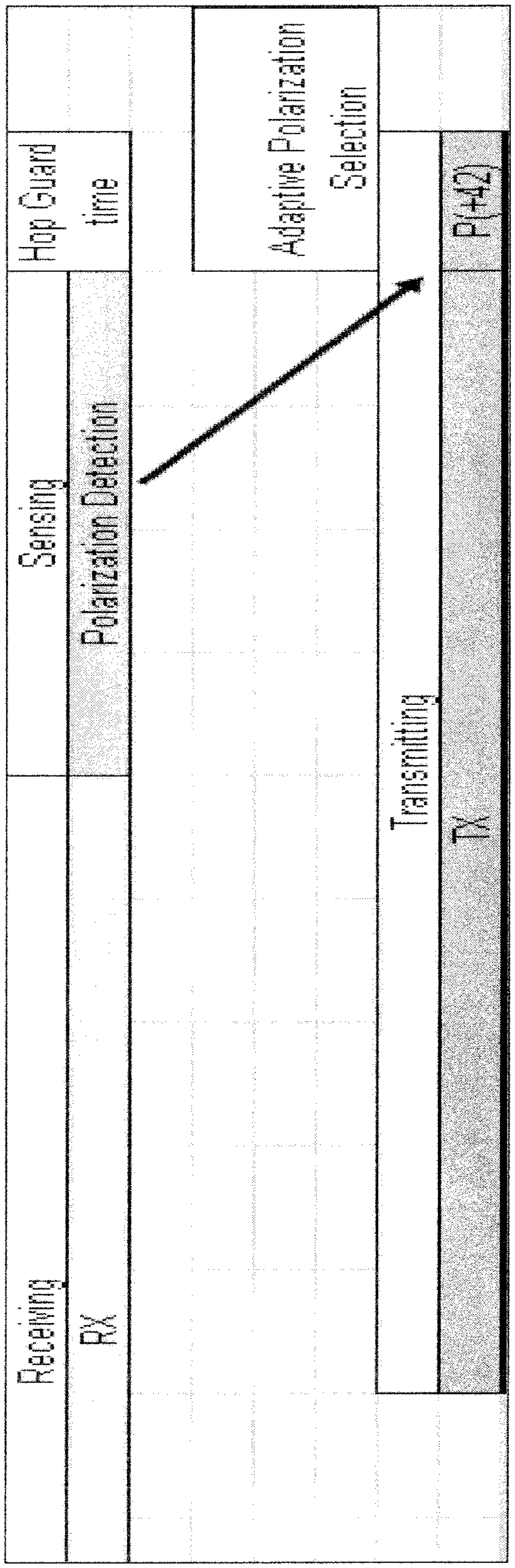
FIG. 9 illustrates an exemplary scheme for an adaptive polarization process.

FIG. 9 illustrates an algorithm that allows optimal rejection of interference while optimizing the communications. In urban combat zones, a vehicle may randomly stop or slow down. It is important for a network to take advantage of these events where the channel is stable to increase it transmission capacity, such that an adaptive process, combined with adaptive modulation, can really improve throughput. Note that during these halts, the unit may be in an ambush and the communication link becomes even more critical.

Modern jammers can measure polarization such that the dual slanted polarization antenna fitted with one phase shifter per radiating element can be very useful. This enables the antenna to have an agile polarization and possibly polarization hopping. In the presence of interference, FIG. 9 presents an algorithm very similar to an adaptive frequency selection. It allows, on a frame or sub frame basis, to maintain optimal or sub-optimal rejection of interferences using a protocol for polarization correction exchange. The polarization variation on the interference should be limited in speed to allow the adaptation process to track the change in polarization. Note that the optimization takes place both with respect to the interferer and the remote unit.

Figures 10A, 10B:
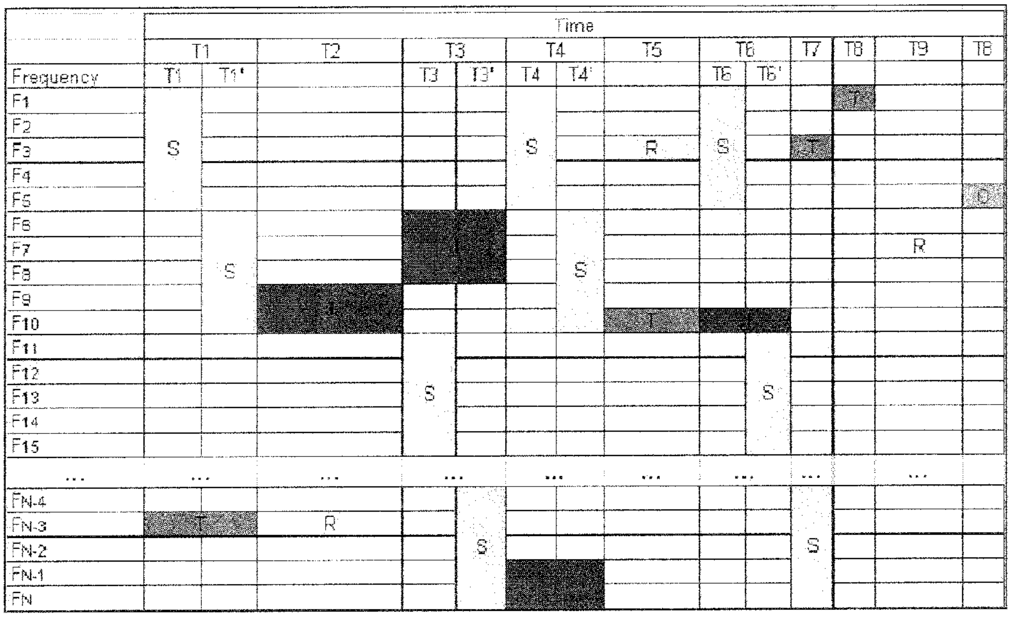
FIGS. 10*a* and 10*b* are tables illustrating the various modes of operation of the communication unit, in accordance with two embodiments.

FIG. 10*a* illustrates one possible scheme for operation of the communication unit 200. In one embodiment, the unit operates over a single channel (or frequency) and therefore, will either transmit or receive at any given time, in any one of sensing, ECM, ECCM, radio communication, or other mode. In another embodiment, the communication unit operates over multiple channels (or frequencies) and therefore, will either transmit or receive on each channel at any given time, in any one of sensing, ECM, ECCM, radio communication, or other another mode. In the table of FIG. 10*a*, two frequencies may be used at any one time, and frequency hopping causes a single channel to move from one frequency to another. For example, at time T1, the communication unit 200 is transmitting at frequency FN-3 while sensing at frequencies F1-F10. During the next time slot, namely T2, the communication unit 200 is jamming at frequencies F9 and F10 while receiving at frequency FN-3. During certain time slots, only one frequency may be used. Note that this embodiment is composed of only one Tax chain and one Rx chain, but the scope of the invention is not limited as such. An other embodiment could have 3 Rx and 2 Tax, or 10 Tax and 4 Rx. Where the Rx could sense or receive modulated data and the different Tax would be jamming, spoofing, with multiple transmissions.

FIG. 10*b* is a more generic illustration of the scheme of operation, whereby the frequency of operation of the receiver is illustrated for a series of consecutive time slots. The same generic illustration may apply to transmitting, jamming, sensing or other types of time slot use. The duration of each time slot and/or time gap between time slots may be variable either pseudo randomly or not. The start of a time slot may be variable or pseudo random with respect to its next occurrence in time, or with respect to the next consecutive time slot, ensuring that any time slot or any sequence of time slot combination has a low probability of intercept (LPI) and a low probability of detection (LPD).

Figure 11:
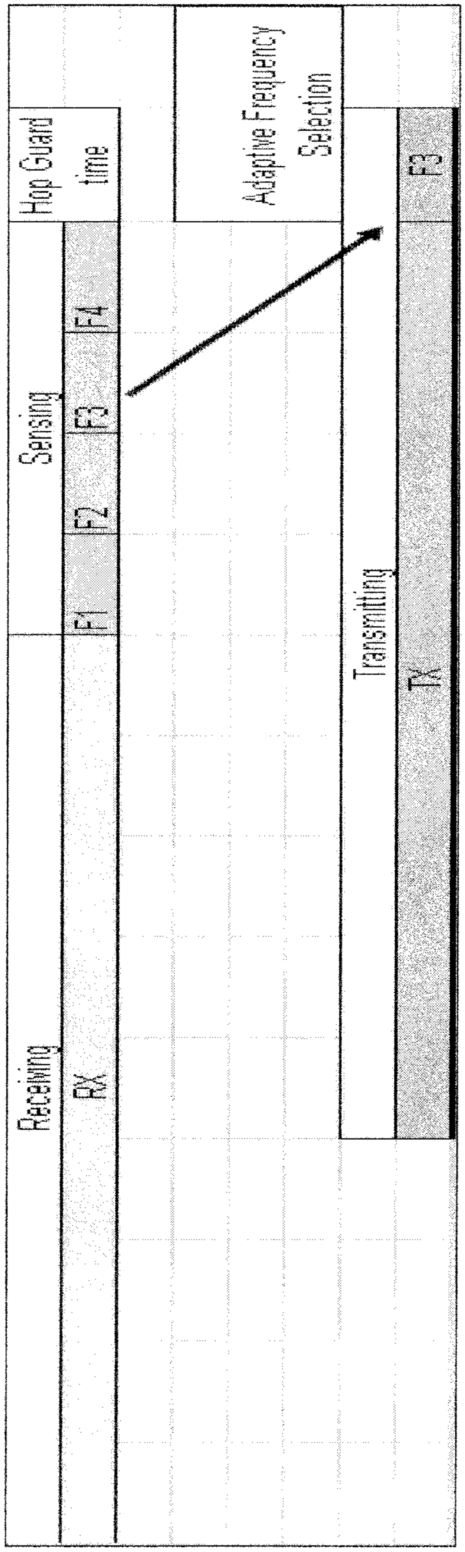
FIG. 11 illustrates an exemplary scheme of sensing and frequency hopping whereby frequency hopping is pro-actively managed by leveraging sensed information in near-real time.

The combination of sensing and detection of a specific operational characteristic can permit a very rapid change or correction in one or many operational characteristics such as frequency, antenna pointing, antenna polarization, output power, bandwidth, waveform, data rate, timing, etc. In one embodiment, an adaptive frequency selection algorithm is used to determine the best frequency at which to receive. The algorithm may use sensing to identify the optimal frequency, request that the remote communication unit switch its transmission to the optimal frequency, and begin receiving at the optimal frequency. This is illustrated in FIG. 11.

In one embodiment, one channel is used exclusively for transmitting while another channel is used exclusively for receiving. Alternatively, both channels may be used for transmitting and receiving.

In one embodiment, some of the slots in the frames may be dedicated to sending and receiving a signal signature. Various parts of the signature are spread throughout a series of slots, with the position of each signature slot known by a friendly receiver. In another embodiment, a communication unit 200 communicates with multiple receivers and different slots are reserved for data from or for different receivers.

Some slots may also be reserved to exchange sensing, authentication, tactical, planning and/or other types of coordination information between two or more communication nodes within a network of radio nodes. This provides an extra communication channel that may be independent from the traffic payload. The extra communication channel can also be used to change frequency to potentially avoid an interferer or a jammer, change any characteristic of a radio link (such as data rate, modulation, filtering, demodulation, etc), to broadcast information to peer radios, or to listen to potential broadcasts from peer radios.

In another example, live spectrum scans may be performed in real time, and jamming detection accuracy can be increased dramatically, even under poor channel quality by using a sensing gap to enable the measurement of the channel in real time.

The multi-mode communication unit 200 described above may be implemented as a computer system that comprises an application running on a processor, the processor being coupled to a memory. The memory accessible by the processor receives and stores data. The memory may be a main memory, such as a high speed Random Access Memory (RAM), or an auxiliary storage unit, such as a hard disk, a floppy disk, or a magnetic tape drive. The memory may be any other type of memory, such as a Read-Only Memory (ROM), or optical storage media such as a videodisc and a compact disc.

The processor may access the memory to retrieve data. The processor may be any device that can perform operations on data. Examples are a central processing unit (CPU), a front-end processor, a microprocessor, a graphics processing unit (GPU/VPU), a physics processing unit (PPU), a digital signal processor, and a network processor. The application is coupled to the processor and configured to perform various tasks as explained above in more detail. An output may be transmitted to a display device.

It should be understood that the modules illustrated in FIG. 2 may be provided in a single application or a combination of two or more applications coupled to the processor. While illustrated in the block diagrams of FIGS. 2 to 8 as groups of discrete components communicating with each other via distinct data signal connections, it will be understood by those skilled in the art that the embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiments.

It should be noted that the present invention can be carried out as a method, can be embodied in a system, a computer readable medium or an electrical or electro-magnetic signal. The embodiments of the invention described above are intended to be exemplary only. The scope of the invention is therefore intended to be limited solely by the scope of the appended claims.

The invention claimed is:

1. A method of operating a multi-mode communication unit, the method comprising:

for each radio frame of a radio communication frame structure, selectively setting a mode of radio frequency operation for one of transmission and reception and selectively setting a given radio frame duration, for operation of the unit in at least one of a radio communication mode of operation and a sensing mode of operation; and interrupting a task within a given radio frame at a time selected in accordance with a set of priorities determined by the unit, and performing a different task for a given radio frame duration, the different task and the given radio frame duration being selected by the unit.

2. The method of claim 1, wherein the set of priorities comprises optimizing frame use of the data structure, and wherein interrupting a task comprises interrupting a transmission of data within a given frame at a time selected in accordance with a sensing instant of a second communication unit to which the data is being transmitted and performing the different task for a duration of the sensing instant of the second communication unit.

3. The method of claim 2, wherein the different task is one of spoofing, jamming, sensing, and receiving.

4. The method of claim 1, further comprising selectively setting a first mode of radio frequency operation for one of transmitting and receiving at a first frequency and selectively setting a second mode of radio frequency operation for one of transmitting and receiving at a second frequency, for respective given radio frame durations, the unit operating in the first mode at the first frequency and the second mode at the second frequency concurrently.

5. The method of claim 4, wherein a change of the mode of radio frequency operation used in a specific radio frame may occur for both the first mode of operation and the second mode of operation concurrently.

6. The method of claim 1, further comprising selecting an optimum channel for one of communicating, sensing, jamming, and spoofing, in real time by changing at least one of frequency and polarization of the unit on a radio frame per radio frame basis.

7. The method of claim 6, further comprising using an information exchange protocol with the second communication unit, where sensing is performed prior to applying a correction to polarization or mode of radio frequency operation.

8. A multi-mode communication unit comprising:

a central module connected to at least one receiver, at least one transmitter, and a waveform processor and adapted for selectively setting a mode of radio frequency operation for each radio frame of a radio communication frame structure for one of transmission and reception for a given radio frame duration, for operation of the unit in at least one of a radio communication mode of operation and a sensing mode of operation; and a task module adapted for selecting a task for a given radio frame wherein the task module comprises a decision engine that selects the task and the given radio frame duration.

9. The unit of claim 8, further comprising:

an electronic counter measures (ECM) module for determining jamming waveforms for transmission; and an electronic counter counter measures (ECCM) module for determining waveforms to counter ECM;

wherein the central module is also adapted for receiving data from the ECM module and the ECCM module and for selectively setting a mode of operation of at least one of ECM and ECCM.

10. The unit of claim 8, wherein the task module is adapted for selecting the task for the given radio frame in accordance with a set of priorities comprising optimizing frame use of the radio communication frame structure, and wherein the decision engine is adapted for interrupting a transmission of data within a given radio frame at a time selected in accordance with a sensing instant of a second communication unit to which the data is being transmitted and performing a different task for a duration of the sensing instant of the second communication unit.

11. The unit of claim 10, wherein the different task is one of spoofing, jamming, sensing, and receiving.

12. The unit of claim 8, wherein the decision engine determines at least one of the task, frequency of the unit, and polarization of the unit at least in part on at least one of external requests and policies from a network or a user.

13. The unit of claim 8, wherein the central module is also adapted to selectively set a first mode of radio frequency operation for one of transmitting and receiving at a first frequency and selectively set a second mode of radio frequency operation for one of transmitting and receiving at a second frequency, for respective given radio frame durations, the unit operating in the first mode at the first frequency and the second mode at the second frequency concurrently.

14. The unit of claim 13, wherein the decision module is adapted to perform interrupts for both the first mode of radio frequency operation and the second mode of radio frequency operation concurrently.

15. The unit of claim 8, wherein the central module is adapted to select an optimum channel for one of communicating, sensing, jamming, and spoofing in real time by changing at least one of frequency and polarization of the unit on a radio frame per radio frame basis.

* * * * *